US012560462B2

(12) United States Patent (10) Patent No.: US 12,560,462 B2
Hauptvogel et al. (45) Date of Patent: Feb. 24, 2026

(54) ERROR ANALYSIS IN A SENSOR

(71) Applicant: VOLKSWAGEN AKTIENGESELLSCHAFT, Wolfsburg (DE)

(72) Inventors: Mathias Hauptvogel, Weferlingen (DE); Tom Padeken, Jaderberg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 443 days.

(21) Appl. No.: 18/249,405

(22) PCT Filed: Oct. 1, 2021

(86) PCT No.: PCT/EP2021/077046
§ 371 (c)(1),
(2) Date: Apr. 18, 2023

(87) PCT Pub. No.: WO2022/083998
PCT Pub. Date: Apr. 28, 2022

(65) Prior Publication Data
US 2023/0384130 A1 Nov. 30, 2023

(30) Foreign Application Priority Data
Oct. 19, 2020 (DE) .................... 10 2020 213 119.8

(51) Int. Cl.
*G01D 18/00* (2006.01)
*G05B 23/02* (2006.01)

(52) U.S. Cl.
CPC ......... *G01D 18/00* (2013.01); *G05B 23/0259* (2013.01); *G01D 2218/10* (2021.05)

(58) Field of Classification Search
CPC ............... G01D 18/00; G01D 2218/10; G05B 23/0259; G05B 23/02; G01R 31/2829
See application file for complete search history.

(56) References Cited

U.S. PATENT DOCUMENTS

| | | | |
|---|---|---|---|
| 4,897,754 A | 1/1990 | Konishi et al. | |
| 5,748,748 A | 5/1998 | Fischer et al. | |
| 2021/0348575 A1 | 11/2021 | Wagner | |

FOREIGN PATENT DOCUMENTS

| | | | | | |
|---|---|---|---|---|---|
| CN | 119128817 B | * | 3/2025 | ........... | G01B 21/042 |
| DE | 3788323 T2 | | 7/1994 | | |
| DE | 19531402 A1 | | 2/1997 | | |

(Continued)

OTHER PUBLICATIONS

English Translation of International Search Report; International Patent Application No. PCT/EP2021/077046, Jan. 18, 2022 (Year: 2022).*

(Continued)

*Primary Examiner* — Mi'schita' Henson
(74) *Attorney, Agent, or Firm* — BARNES & THORNBURG LLP

(57) ABSTRACT

A method for analyzing a sensor with respect to unstable errors, wherein a gradient signal is generated based on a sensor signal. Based on the gradient signal, an evaluation unit is used to assign a slope category to a first slope of the sensor signal and a second slope of the sensor signal, the second slope following the first slope. The evaluation unit ascertains a class of error based on the slope categories assigned to the first slope and the second slope.

27 Claims, 5 Drawing Sheets

(56) References Cited

FOREIGN PATENT DOCUMENTS

| DE | 102006037851 | A1 |   | 2/2008 |   |   |
|----|--------------|-----|---|--------|---|---|
| DE | 102014116484 | A1 | * | 5/2016 | .......... | G01R 31/088 |
| EP | 0259881 | A2 |   | 3/1988 |   |   |
| EP | 3354888 | A1 |   | 8/2018 |   |   |
| EP | 3760470 | A1 |   | 1/2021 |   |   |
| JP | 2019052943 | A |   | 4/2019 |   |   |
| WO | 2020058001 | A1 |   | 3/2020 |   |   |

OTHER PUBLICATIONS

Machine Translation of DE102014116484 to Rasbornig et al.; May 15, 2016 (Year: 2016).*
Machine Translation of JP 2019052943A to Kishida; Apr. 4, 2019 (Year: 2019).*
International Search Report; International Patent Application No. PCT/EP2021/077046; Jan. 18, 2022.

* cited by examiner

ERROR ANALYSIS IN A SENSOR

PRIORITY CLAIM

This patent application is a U.S. National Phase of International Patent Application No. PCT/EP2021/077046, filed 1 Oct. 2021, which claims priority to German Patent Application No. 10 2020 213 119.8, filed 19 Oct. 2020, the disclosures of which are incorporated herein by reference in their entireties.

SUMMARY

Illustrative embodiments relate to a method for error analysis in a sensor with respect to unstable errors, wherein the sensor outputs an analog sensor signal as a function of a measured variable. Illustrative embodiments furthermore relate to a diagnostic device for a sensor and a transportation vehicle having a corresponding diagnostic device.

BRIEF DESCRIPTION OF THE DRAWINGS

Disclosed embodiments are explained in more detail below with reference to the schematic drawings. In the figures, identical or functionally identical elements can be provided with the same reference signs. The description of identical or functionally identical elements is possibly not necessarily repeated with respect to various figures.

In the figures.

DETAILED DESCRIPTION

Figure 1:
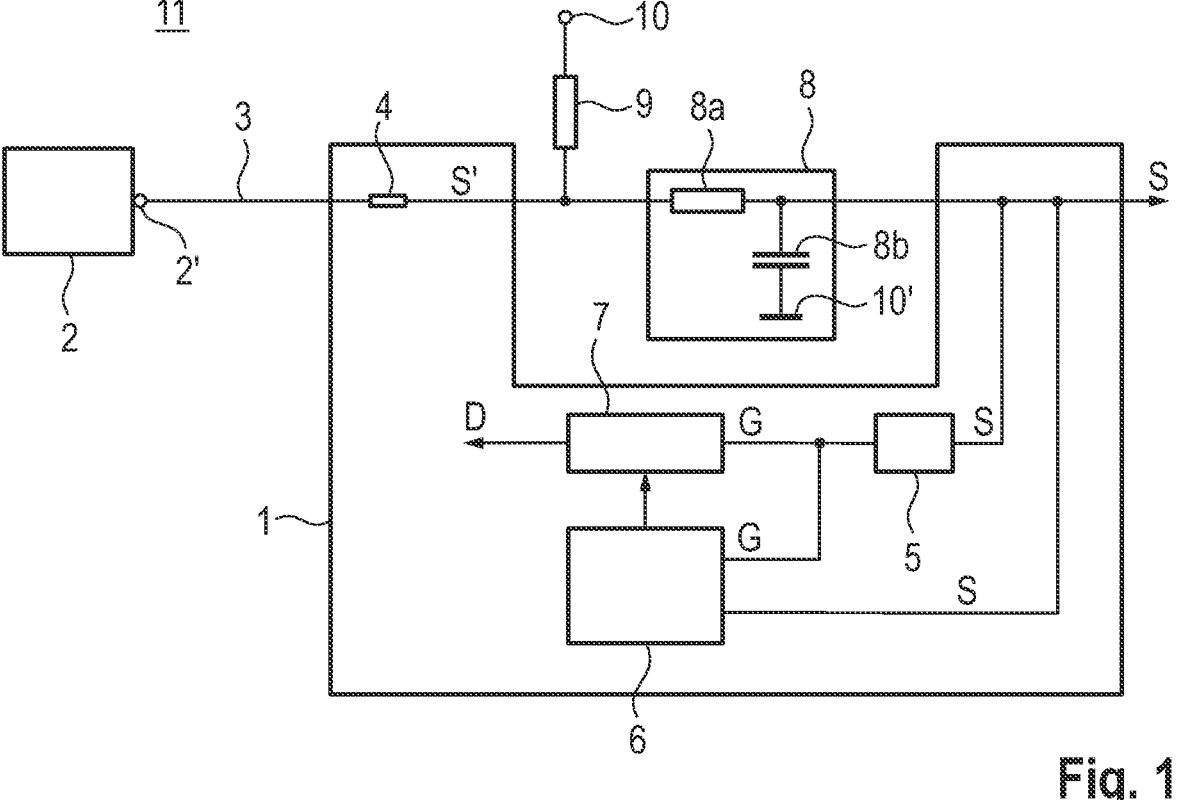
FIG. 1 shows a schematic representation of an exemplary embodiment of a diagnostic device and a sensor device.

Errors of analog sensors or of connecting lines of analog sensors have an influence on the accuracy and reliability of those functions and devices which use the analog sensor output signal further. This applies, for example, in the context of automobile applications, where various analog sensors, such as pressure sensors, temperature sensors, acceleration sensors, and so on are used. Pressure and temperature sensors can be used, for example, for engine control. In particular, an engine control unit can control the engine torque as a function of measured pressure or temperature values. In this special example, erroneous output signals of the analog sensors, thus, have a direct influence on the performance or reliability of the transportation vehicle. This applies analogously in other applications.

However, not only stable errors are relevant, thus, for example, permanent short circuits or permanently open contacts, but also unstable errors, in which the faulty state, thus, for example, the short circuit or the open contact, appears intermittently. In this context, reference can also be made to intermittent errors, periodic contact lift-offs, periodic intermittent short circuits or periodic intermittent open contacts or, colloquially, also to loose contacts. Such unstable errors can also have effects, for example, in the automobile context, on the performance, the fuel consumption, or the exhaust gas composition. It is, therefore, fundamentally desirable to be able to reliably recognize unstable errors in analog sensors.

Moreover, for example, it is required or beneficial for assessing the relevance or criticality of the error or for more extensive diagnosis of the error cause or for error elimination not only to be able to establish the presence of an unstable error, but also to be able to determine its error type, thus, for example, whether an intermittent short circuit or an open contact is present.

In document WO 2020/058001 A1, a method and a device for diagnosing a lambda sensor are described. A diagnostic DC voltage or a diagnostic AC voltage is fed into the lambda sensor, which drops over a Nernst cell of the lambda sensor. Depending on whether a DC or AC voltage is acquired at the corresponding terminals, at which the voltage is fed, and possibly as a function of the amplitude of the acquired voltage, it is possible to distinguish between a short circuit and a line break of the Nernst cell.

However, this method is especially designed for diagnosis of a lambda sensor and cannot be transferred to arbitrary analog sensors. Moreover, the diagnostic principle of feeding a diagnostic voltage and analyzing the corresponding response is not suitable for unstable errors.

Against this background, disclosed embodiments specify an improved concept for error analysis of an analog sensor, which has increased reliability in the detection of unstable errors and/or can be applied flexibly to various types of analog sensors.

The improved concept is based on the idea of analyzing an analog sensor signal with respect to two successive flanks. The flanks are assigned here in each case to one of two or more specified flank categories, and an error type is determined as a function thereof.

According to the improved concept, a method for error analysis in a sensor, in particular, an analog sensor, with respect to unstable errors is specified, wherein the sensor outputs a time-dependent analog sensor signal as a function of a measured variable, in particular, as a function of a value of a measured variable. A gradient signal is generated as a function of the sensor signal, in particular, by a differentiator. By use of an evaluation unit, a flank category of at least two specified flank categories is assigned to a first flank of the sensor signal based on the gradient signal. By use of the evaluation unit, a flank category of the at least two flank categories is assigned to a second flank of the sensor signal based on the gradient signal, wherein the second flank follows the first flank. By use of the evaluation unit, an error type is determined as a function of the flank category which was assigned to the first flank and as a function of the flank category which was assigned to the second flank.

Here and hereinafter, a sensor which outputs an analog sensor signal as a function of the value of the measured variable, in which an amplitude or an absolute value of the sensor signal, thus, changes continuously or essentially continuously with the value of the measured variable, is designated as an analog sensor. The analog sensor can also be, for example, a part of a sensor arrangement which contains an analog-to-digital converter. The analog-to-digital converter can convert the analog sensor signal into a digitized sensor signal. However, according to the improved concept, in particular, the analog, non-digitized sensor signal is used as described.

An unstable error can be understood here and hereinafter as an error which is not present continuously or permanently and/or the effects of which, in particular, on the sensor signal, are not continuously or permanently measurable or the effects of which, in particular, on the sensor signal, are variable over time. The unstable error can also be viewed and designated as an intermittent error.

The sensor signal corresponds to a current or a voltage which is measurable at a measurement terminal, to which the evaluation unit and possibly the differentiator is connected directly or indirectly. The measurement terminal is directly or indirectly connected to a signal output of the sensor, for example, wired. The absolute value or the amplitude of the sensor signal corresponds here to the value of a physical measured variable. Depending on the embodiment of the sensor, these can be different measured variables, such as a pressure, a temperature, an acceleration, and so on. In various exemplary embodiments, further electronic components, such as signal filters or the like, can also be arranged between sensor output and measurement terminal. The sensor signal then corresponds, for example, to the filtered output signal of the sensor.

If the connection between sensor output and measurement terminal is faulty, for example, interrupted or short circuited, the signal measured at the measurement terminal, thus, does not necessarily correspond to the signal applied at the sensor output. The signal measured at the measurement terminal, which can also be viewed as the apparent sensor signal, is nonetheless designated here and hereinafter as the sensor signal.

The gradient signal can be understood as a time-dependent signal which corresponds or approximately corresponds to the time derivative of the sensor signal. The gradient signal can be determined here, for example, by a differentiator, in particular, by an analog differentiator circuit, by a digital evaluation circuit, or another computing unit.

The evaluation circuit can include, for example, an electronic control unit, in particular, for a transportation vehicle, a microcontroller, or another computing unit or processor unit and/or other analog and/or digital circuits.

If the sensor is designed or provided as a sensor for a transportation vehicle, the transportation vehicle can, thus, include, for example, an electronic control unit, which receives the sensor signal to carry out one or more transportation vehicle functions, for example, for the engine control. The evaluation unit and/or the unit which generates the gradient signal can be part of this electronic control unit or can be embodied separately therefrom.

A flank can be understood here and hereinafter as a signal flank of an analog signal, in particular, of the analog sensor signal. Reference can be made to a flank in an analog signal if the amplitude of the signal or the absolute value of the amplitude of the signal changes within a predefined period of time by a predefined minimum value or more, in particular, changes monotonously rising or monotonously falling. The predefined period of time or the minimum value or the ratio thereof to one another are to be defined in accordance with the specific application situation and, in particular, in accordance with the design of the sensor and the value range of the sensor signal.

In certain analog sensors, the sensor signal can assume, for example, values in a range from 0 to several volts, for example, up to 5 V or 10 V. In such a sensor, reference can be made to a flank, for example, when the absolute value of the sensor signal changes by several volts within several tens of milliseconds or several hundreds of milliseconds. This numeric example serves solely to illustrate the concept of the flank and is in no way to be understood as restrictive.

The second flank following the first flank can be understood to mean that no further flank of the sensor signal is located between the first flank and the second flank. However, this does not necessarily imply that the second flank directly follows the first flank. Rather, the amplitude or the absolute value of the sensor signal can be more or less constant between the flanks or can change, without the condition for a flank being met.

The error type, which is determined as a function of the flank category of the first flank and the flank category of the second flank, is, in particular, an error type of two or more specified error types. The two or more error types can include an error type which corresponds to an open circuit of the signal output of the sensor. The open circuit can be understood here as a state in which the electrical connection of the measurement terminal to the signal output is interrupted, thus, in a certain sense is not connected (English: "floating"). This state can also be designated as an "open circuit". The two or more error types can also include one or more error types which each correspond to a short circuit of the signal output. Depending on the exemplary embodiment, different error types can be provided for short circuits having different reference points or reference potentials or a common error type can be provided for short circuits having multiple reference points or reference potentials.

By way of the improved concept, the two successive flanks are, thus, analyzed on the basis of the gradient signal, thus, with regard to how strongly the respective flank rises or falls, to define respective flank categories. Based on the two flank categories, for example, on the sequence of different flank categories to one another, the error type is then determined. The improved concept is, thus, suitable for identifying and characterizing unstable errors, such as intermittent short circuits or open circuits or other periodic contact lift-offs or of loose contacts.

Because the method is solely based on the evaluation of the sensor signal generated and used in any case for the respective task, additional specific analysis signals do not have to be generated, for example, and the signal response of the sensor system thereto does not have to be evaluated. The method according to the improved concept can, thus, be used universally without fundamental changes for a variety of analog sensors or for arbitrary analog sensors. Only parameters, limiting values, and the like are to be adapted if necessary for this purpose.

According to at least one exemplary embodiment of the disclosed method according to the improved concept, the flank category is assigned to the first flank based on the gradient signal during a first period of time and the corresponding flank category is assigned to the second flank based on the gradient signal during a second period of time. The first period of time corresponds here to a period of time of the first flank and the second period of time corresponds to a period of time of the second flank, thus, a respective period of time at which the respective flank occurs in the sensor signal.

According to at least one disclosed embodiment, the determination of the error type includes generating an output signal, which codes the error type as a function of the flank category assigned to the first flank and of the flank category assigned to the second flank. Alternatively or additionally, the determination of the error type can include that the information that an error of the respective error type has occurred is stored. This can take place, for example, on the basis of one or more corresponding counters or on the basis of other storage methods. Alternatively or additionally, the determination of the error type can include that the gradient signal is integrated. The integration can take place separately for different error types or jointly for all error types. A diagnosis of the sensor with respect to unstable errors even over a longer period of time, for example, can be carried out by the storage, the integration, and/or the generation of the output signal.

According to at least one disclosed embodiment, the at least two flank categories contain a first flank category and a second flank category. For example, the first and the second flank category can each correspond to the presence of an error, thus, do not occur in an error-free state of the sensor or the connection of the signal output to the measurement terminal.

According to at least one disclosed embodiment, the at least two flank categories contain a third flank category and/or a fourth flank category. For example, the third and/or the fourth flank category can each correspond to the presence of an error.

According to at least one disclosed embodiment, the first flank is only assigned to the first flank category of the at least two flank categories when the gradient signal exceeds a positive first gradient limiting value during the first flank.

According to at least one disclosed embodiment, the second flank is only assigned to the first flank category when the gradient signal exceeds the first gradient limiting value during the second flank.

The formulations "during the first flank" or "during the second flank" can be understood to mean that they indicate a process during a corresponding period of time which corresponds to the respective flank, during which the flank is, thus, present in the sensor signal.

The gradient signal exceeding a gradient limiting value can be understood to mean that the gradient signal is initially less than or equal to the gradient limiting value and then assumes a value which is greater than the gradient limiting value. The gradient signal falling below a gradient limiting value can be understood to mean that the gradient signal is initially greater than or equal to the gradient limiting value and then assumes a value which is less than the gradient limiting value. The sensor signal exceeding or falling below a signal limiting value can also be understood analogously.

The first flank category is, thus, present in other words when the flank corresponds to a rising flank of the sensor signal and the rise at least temporarily has a slope which exceeds a slope defined by the first gradient limiting value. Such a flank can also be designated as a sudden rise of the sensor signal.

A value range for the amplitude of the sensor signal can be defined and restricted by a first reference potential and a second reference potential. The first reference potential can also be designated as the upper reference potential and the second reference potential as the lower reference potential, wherein the lower reference potential is less than the upper reference potential. For example, the first reference potential can be a positive electrical potential and the second reference potential can be a negative reference potential or a zero potential or ground potential. However, other definitions are also possible. In particular, the upper reference potential can also correspond to the zero potential or ground potential and the lower reference potential can accordingly be negative.

The first flank category, thus, the sudden rise of the sensor signal, occurs, in particular, if a short circuit of the signal output of the sensor having the upper reference potential is established. In addition, the first flank category occurs, for example, when a short circuit of the signal output having the lower reference potential is eliminated.

Accordingly, statements for categorizing or determining the error type can be made by the analysis of the first and the second flank with respect to the first flank category.

According to at least one disclosed embodiment, the first flank is only assigned to a second flank category of the at least two flank categories if the gradient signal falls below a negative second gradient limiting value during the first flank.

According to at least one disclosed embodiment, the second flank is only assigned to the second flank category if the gradient signal falls below the second gradient limiting value during the second flank.

The second flank category, thus, corresponds to a falling flank of the sensor signal, wherein the fall at least temporarily has a slope, in particular, a negative slope, the absolute value of which is greater than the slope defined by the second gradient limiting value. Such a flank can also be designated, for example, as a sudden fall of the sensor signal.

Such a sudden fall of the sensor signal occurs, for example, if the short circuit of the signal output having the upper reference potential is eliminated or if the short circuit of the signal output having the lower reference potential is established. In addition, a sudden fall of the sensor signal can also occur if the open circuit of the signal output is ended or eliminated.

A more specific determination of the error type can, thus, be carried out on the basis of the second flank category, in particular, in combination with the first flank category.

According to at least one disclosed embodiment, the first flank is only assigned to the first flank category if the sensor signal exceeds a first signal limiting value during the first flank and/or the second flank is only assigned to the first flank category if the sensor signal exceeds the first signal limiting value during the second flank.

According to at least one disclosed embodiment, the first flank is only assigned to the second flank category if the sensor signal falls below a second limiting value during the first flank and/or the second flank is only assigned to the second flank category if the sensor signal falls below the second signal limiting value during the second flank.

In particular, the absolute value of the first signal limiting value is greater than the absolute value of the second signal limiting value here.

In such exemplary embodiments, in addition to the gradient signal exceeding the first gradient limiting value or the gradient signal falling below the second gradient limiting value, a further condition is, thus, provided in each case to assign the flank to the first or the second flank category. In such exemplary embodiments, it is therefore not sufficient if the flank rises or falls steeply enough, rather it is also relevant whether the respective flank exceeds or falls below a corresponding value of the sensor signal itself.

It is, thus, possible to distinguish actual errors, such as short circuits or open circuits, from other reasons which can result in a rapid rise or fall of the sensor signal. This can be caused, for example, by a very rapidly changing value of the underlying physical measured variable, without an error existing. This is also sometimes referred to as a so-called load shock in this context. Error-free changes of the physical measured variable having a high rate of change, thus, a steep rise or fall of the sensor signal, generally take place within certain limits, however, which are less than the overall possible value range for the sensor signal. A reliable differentiation between errors and other reasons for the change of the sensor signal can, thus, be distinguished by the appropriately adapted selection of the first and/or second signal limiting value. In other words, the risk for false-positive error determinations can be reduced.

According to at least one disclosed embodiment, the first flank is assigned to the first flank category precisely if the gradient signal exceeds the first gradient limiting value during the first flank and the sensor signal exceeds the first signal limiting value during the first flank.

According to at least one disclosed embodiment, the second flank is assigned to the first flank category precisely if the gradient signal exceeds the first gradient limiting value during the second flank and the sensor signal exceeds the first signal limiting value during the second flank.

According to at least one disclosed embodiment, the first flank is assigned to the second flank category precisely if the gradient signal falls below the second gradient limiting value during the first flank and the sensor signal falls below the second signal limiting value during the first flank.

According to at least one disclosed embodiment, the second flank is assigned to the second flank category precisely if the gradient signal falls below the second gradient limiting value during the second flank and the sensor signal falls below the second signal limiting value during the second flank.

According to at least one disclosed embodiment, the error type is determined as an intermittent short circuit of the signal output of the sensor to a first reference potential terminal if, in particular, precisely if, the first flank was assigned to the first flank category and the second flank was assigned to the second flank category, wherein the first reference potential terminal is at the first reference potential.

In this case, in other words initially a sudden rise of the sensor signal is present and then a sudden fall of the sensor signal. If the short circuit to the first reference potential terminal is established, the sensor signal, thus, assumes a value within a short time which is close to the first reference potential. If the short circuit is then eliminated again, the sensor signal, thus, assumes the original value again or another value which at least approximately actually corresponds to the physical measured variable, so that the described flank sequence results.

In this way, the presence of an intermittent short circuit to the first reference potential terminal can be detected and categorized reliably by the improved concept.

According to at least one disclosed embodiment, the error type is determined as an intermittent short circuit of the signal output to the second reference potential terminal if the first flank was assigned to the second flank category and the second flank was assigned to the first flank category, wherein the first reference potential terminal and the second reference potential terminal are at different electrical reference potentials. In particular, the second reference potential terminal is at the second reference potential.

In this case, in other words initially a sudden fall of the sensor signal is present and then a sudden rise of the sensor signal. If the short circuit to the second reference potential terminal is established, the sensor signal, thus, assumes a value within a short time which is close to the second reference potential. If the short circuit is then eliminated again, the sensor signal, thus, assumes the original value again or another value which at least approximately actually corresponds to the physical measured variable, so that the described flank sequence results.

According to at least one disclosed embodiment, the first flank is only assigned to a third flank category of the at least two flank categories if, in particular, precisely if, the gradient signal exceeds a positive third gradient limiting value and does not exceed the first gradient limiting value during the first flank.

The third gradient limiting value is less than the first gradient limiting value here.

In other words, in such a situation a signal rise of the sensor signal takes place, which is not as steep as is the case in a sudden rise according to the above definition, but is at least as steep as required by the third gradient limiting value. On the basis of such exemplary embodiments, it is possible to distinguish according to the improved concept between sudden rises of the sensor signal and other error-relevant signatures of the sensor signal. A more specific determination of the error type may, thus, be implemented.

For example, a flank of the third flank category can occur if an open circuit of the signal output is generated. In such a case, the signal output measured as the sensor signal can be charged by the first reference potential via provided or parasitic ohmic resistances and/or capacitances, so that a signal rise delayed in comparison to the described sudden rise of the sensor signal results. It is, thus, possible on the basis of the improved concept to reliably distinguish between a short circuit of the signal output to the reference potential and an open circuit of the signal output. According to at least one disclosed embodiment, the error type is determined as an intermittent open circuit of the signal output if the first flank was assigned to the third flank category and the second flank was assigned to the second flank category.

According to at least one disclosed embodiment, the first flank is assigned to the third flank category of the at least three flank categories only if, in particular, precisely if, the gradient signal falls below a negative fourth gradient limiting value and does not fall below the second gradient limiting value during the first flank.

In such exemplary embodiments, the above explanations with respect to the third flank category apply analogously, wherein an inverted polarity of the reference potential terminals is presumed.

According to at least one disclosed embodiment, the error type is determined as an open circuit of the signal output if the first flank was assigned to the third flank category and the second flank was assigned to the first flank category.

According to at least one disclosed embodiment, a value of a first counter is increased by a specified increment if the error type was determined as the intermittent short circuit to the first reference potential terminal. Alternatively, a reduction of the first counter by a corresponding decrement can be provided.

According to at least one disclosed embodiment, a value of a second counter is increased by a specified increment if the error type was determined as the intermittent short circuit to the second reference potential terminal. Alternatively, a reduction of the second counter by a corresponding decrement can be provided.

According to at least one disclosed embodiment, a value of a third counter is increased by a specified increment if the error type was determined as the intermittent open circuit. Alternatively, a reduction of the third counter by a corresponding decrement can be provided.

According to at least one disclosed embodiment, a warning signal is generated, in particular, by the evaluation unit, if the value of the first counter is greater than or equal to a first threshold value and/or if the value of the second counter is greater than or equal to a second threshold value and/or if the value of the third counter is greater than or equal to a third threshold value.

A particularly simple diagnosis is enabled by the counting and the possible generation of the warning signal. Because the warning is not already generated upon a single detection of an intermittent error, the robustness and the availability of the system are improved, in that critical or self-healing errors do not result in the warning.

According to at least one disclosed embodiment, in particular, by an integrator, at least one diagnostic signal is generated as a function of a height of the first flank and/or a height of the second flank.

The height can be determined by integration of the gradient signal during the first or the second flank. The diagnostic signal can correspond to the integrated gradient signal in various exemplary embodiments.

For example, the at least one diagnostic signal can be generated as a function of the determined error type. In particular, the integration can take place for each of the error types separately from one another, so that a more specific diagnosis is enabled.

According to the improved concept, a diagnostic device for error analysis of a sensor with respect to unstable errors is also specified, wherein the sensor is configured to output an analog sensor signal, which is time-dependent, in particular, as a function of a measured variable, thus, is designed as an analog sensor. The diagnostic device includes a differentiator, which is configured to generate a gradient signal as a function of the sensor signal. The diagnostic device includes an evaluation unit, which is configured to assign a flank category of at least two specified flank categories to a first flank of the sensor signal based on the gradient signal. The evaluation unit is configured to assign a flank category of the at least second flank categories to a second flank of the sensor signal following the first flank based on the gradient signal. The evaluation unit is configured to determine an error type as a function of the flank category assigned to the first flank and the flank category assigned to the second flank.

The sensor is not part of the diagnostic device here. The diagnostic device can include, for example, a terminal for connecting the sensor, in particular, to connect the signal output of the sensor to the diagnostic device.

According to at least one disclosed embodiment of the diagnostic device according to the improved concept, the diagnostic device includes an integrator, which is configured to generate a diagnostic signal by integration of the gradient signal during the first flank and/or during the second flank, in particular, as a function of the determined error type.

Further exemplary embodiments of the diagnostic device according to the improved concept follow directly from the various exemplary embodiments of the disclosed method according to the improved concept and vice versa. In particular, a diagnostic device according to the improved concept can be configured or programmed to carry out a method according to the improved concept or it carries out such a method.

A sensor device is also specified according to the improved concept. The sensor device includes an analog sensor and a diagnostic device according to the improved concept, wherein the analog sensor is coupled or connected to the diagnostic device, wherein the connection can be embodied directly or indirectly via one or more further components of the sensor device.

According to at least one disclosed embodiment of the sensor device, the sensor is designed as a pressure sensor, for example, as an intake manifold pressure sensor for a transportation vehicle, or as a temperature sensor, for example, as an intake air temperature sensor for a transportation vehicle.

According to at least one disclosed embodiment, the sensor device or the diagnostic device contains a low-pass filter, for example, an RC element. The low-pass filter is configured to generate a filtered sensor signal as a function of the sensor signal. The low-pass filter can be arranged, for example, between the analog sensor and the diagnostic device.

A transportation vehicle having a diagnostic device and/or a sensor device according to the improved concept is also specified according to the improved concept.

According to at least one disclosed embodiment of the transportation vehicle according to the improved concept, the transportation vehicle includes an engine control unit, and the engine control unit contains the diagnostic device or the evaluation unit of the diagnostic device.

The disclosure also comprises the combinations of the features of the described embodiments.

In the exemplary embodiments, the described components each represent individual features of the disclosure to be observed independently of one another, which each also refine the disclosure independently of one another and are therefore to be viewed as part of the disclosure individually or in a combination other than that shown. Furthermore, the described exemplary embodiments can also be supplemented by further features of the disclosure already described.

FIG. 1 schematically shows an exemplary embodiment of a sensor device 11 according to the improved concept, which contains a diagnostic device 1 according to the improved concept and an analog sensor 2.

The sensor 2 has a signal output 2', at which it can output an analog output signal S in particular, a sensor voltage. The diagnostic device 1 includes a sensor terminal 4, which is connected by one or more electrical lines 3 to the signal output 2', to obtain the output signal S'.

In addition, a low-pass filter 8 is shown in FIG. 1, which is schematically shown as an RC element having a resistor 8a and a capacitor 8b. The capacitor 8b is connected here using one terminal at the second reference potential terminal 10' and using another terminal at a terminal of the resistor 8a. The further terminal of the resistor 8a is coupled via a pull-up resistor 9, to the first reference potential terminal 10. At an output of the low-pass filter 8, it can accordingly output a filtered output signal, which can then be viewed as the sensor signal S. In alternative exemplary embodiments, the output signal S' can also be viewed as the sensor signal S.

The low-pass filter 8 and/or the pull-up resistor 9 can be, for example, part of a control unit for a transportation vehicle. It is to be noted that other disclosed embodiments of the low-pass filter 8 can also be provided. In error-free operation of the sensor 2, it supplies the output signal S' via the signal terminal 4 to the low-pass filter 8, which accordingly generates the sensor signal S.

The diagnostic device 1 includes a differentiator 5, which is connected to the sensor terminal 4 to receive the sensor signal S. The differentiator 5 is configured to differentiate the sensor signal S and, thus, generate a gradient signal G. The diagnostic device 1 additionally includes an evaluation unit 6, which is connected to the sensor terminal 4 to receive the sensor signal S, and to an output of the differentiator 5, to receive the gradient signal G.

The diagnostic device 1 can optionally contain one or more integrators 7, which are connected to the output of the differentiator 5 to receive the gradient signal G and can be activated, for example, by the evaluation unit 6.

In addition, a first reference potential terminal 10 is shown in FIG. 1, which is at a first electrical potential that is positive, for example. The first reference potential terminal 10 can correspond, for example, to an output potential of a voltage source. In addition, a second reference potential terminal 10' is shown, which is at a second electrical potential, for example, at a ground potential.

The functionality of the diagnostic device 1 or the sensor device 11 is explained in more detail hereinafter on the basis of various error scenarios with reference to FIGS. 2A to 4B.

Figure 2A:
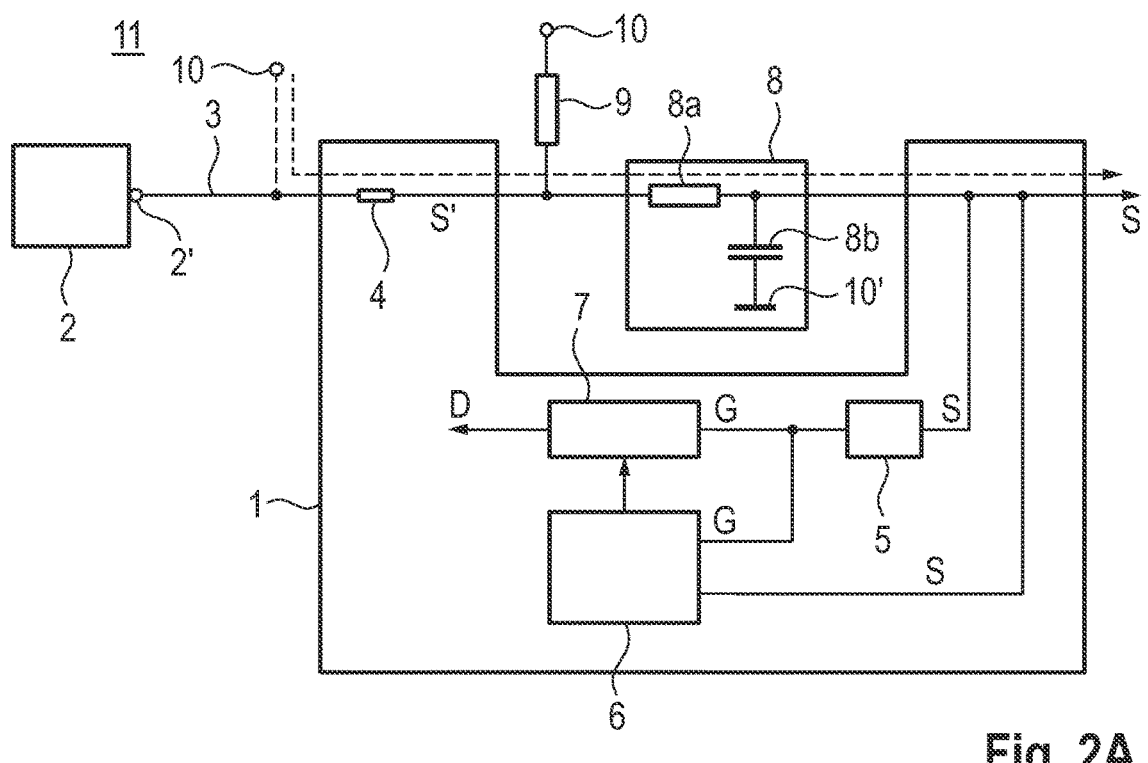
FIG. 2A shows a schematic representation of the disclosed diagnostic device and the sensor device of FIG. 1 in response to a first error type being present.

The sensor device 11 is shown in FIG. 2A, wherein an intermittent short circuit between the signal output 2' of the sensor 2 and the first reference potential terminal 10 is indicated by a dashed connecting line. In this case, a current flows from the first reference potential 10 via the sensor terminal 4 into the low-pass filter 8.

Figure 2B:
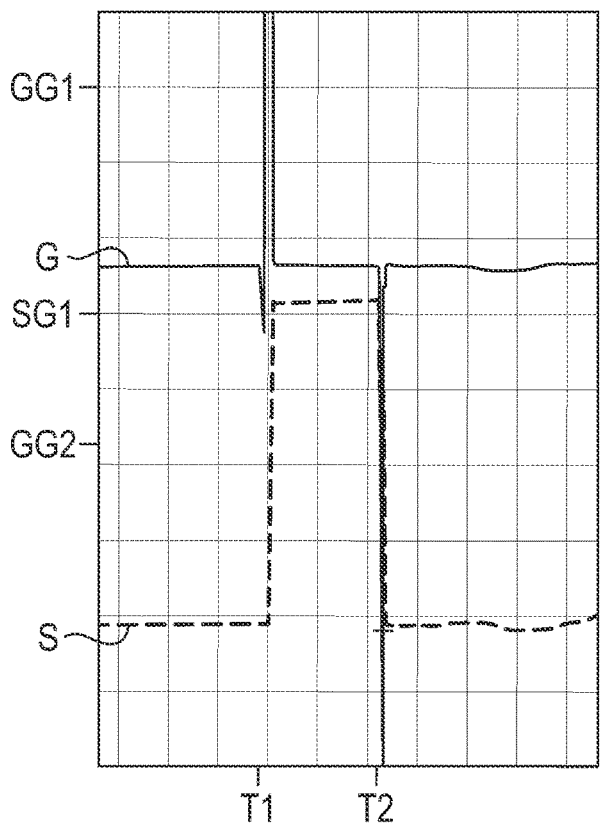
FIG. 2B shows a schematic signal diagram relating to the first error type of FIG. 2A.

In FIG. 2B, the sensor signal S and the associated gradient signal G are shown schematically as a function of time. At a point in time T1, the described short circuit to the first reference potential terminal 10 is established as shown in FIG. 2A. As a consequence, a sudden rise of the sensor signal S is displayed, so that the gradient signal G assumes a high positive value. At a following point in time T2, the short circuit is eliminated again, so that the sensor signal displays a sudden fall, which is approximately as strong, the gradient signal G, thus, assumes a corresponding negative value having high maximum absolute value.

The duration of the sudden rise or the sudden fall can be in the order of magnitude of a few milliseconds, for example, less than 5 ms. The maximum or minimum values of the gradient signal G can assume absolute values in the range of several hundred or thousand V/s.

The evaluation unit 6 compares, for example, the gradient signal G to a first gradient limiting value GG1, which is positive in the present example, and a second gradient limiting value GG2, which is negative in the present example. The sudden rise of the sensor signal S is sufficiently steep, so that the gradient signal G exceeds the first gradient limiting value GG1, and the sudden fall is also sufficiently steep that the gradient signal G falls below the second gradient limiting value GG2. In addition, the evaluation unit 6 can also compare the value of the sensor signal S to a first signal limiting value SG1. This is also exceeded by the sensor signal S during the sudden rise.

In summary, a first flank is, thus, present, which corresponds to a sudden rise of the sensor signal S, in which the sensor signal S exceeds the first signal limiting value SG1. This is followed by a second flank corresponding to a sudden fall of the sensor signal S. This behavior of two successive flanks can be explained by the establishment of the short circuit at the point in time T1 and the elimination of the short circuit again at the point in time T2. The evaluation unit 6 can, thus, define a corresponding error type. For example, the evaluation unit 6 can control the integrator 7 to partially integrate the gradient signal G, for example, during one of the respective flanks, to generate a diagnostic signal D. If further events take place as described with respect to FIGS. 2A and 2B, the diagnostic signal D, thus, rises accordingly and can be evaluated for the error diagnosis.

Figure 3A:
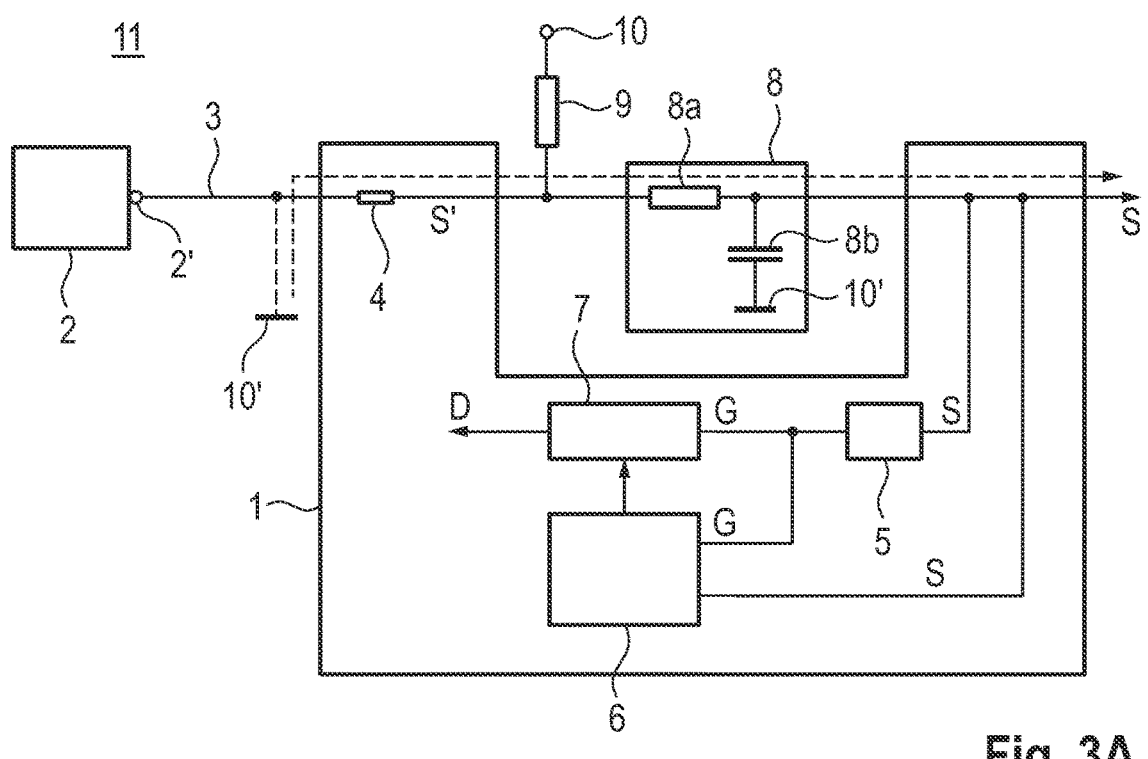
FIG. 3A shows a schematic representation of the disclosed diagnostic device and the sensor device of FIG. 1 in response to a second error type being present.
Figure 3B:
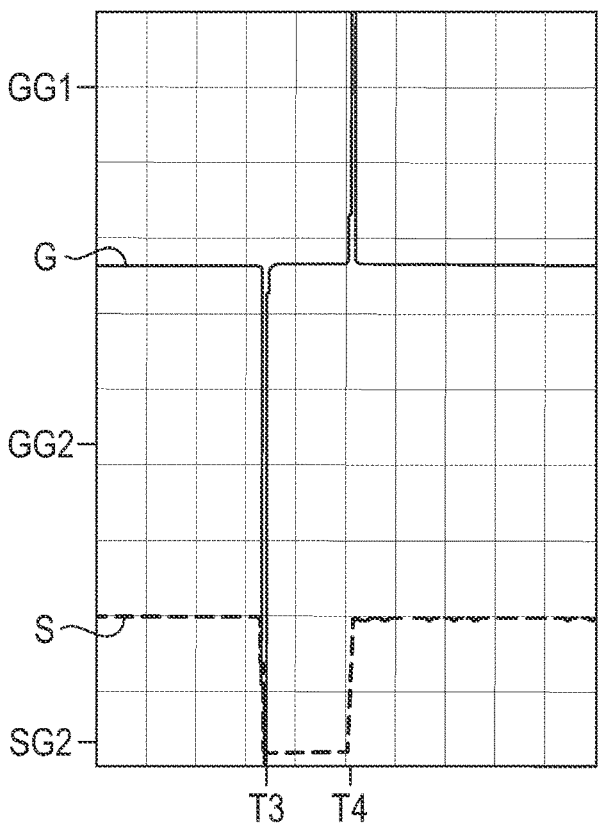
FIG. 3B shows a schematic signal diagram relating to the second error type of FIG. 3A.

The sensor device 11 corresponding to an intermittent short circuit of the signal output 2' to the second reference potential terminal 10' is shown in FIG. 3A. The associated signal diagram is shown in FIG. 3B.

The signal curves are in a certain sense reversed from the situation of FIG. 2A and FIG. 2B. The short circuit is, thus, established at the point in time T3, which is accompanied by a sudden fall of the sensor signal S, in which the gradient signal G falls below the second gradient limiting value GG2 and the sensor signal S falls below a second signal limiting value SG2, which is close to the second reference potential. At the adjacent point in time T4, the short circuit is eliminated again, which results in a corresponding sudden rise of the sensor signal S with the gradient signal G correspondingly exceeding the first gradient limiting value GG1.

This behavior can then be identified similarly as described above by the intermittent short circuit of the signal output 2' to the second reference potential terminal 10'.

Figure 4A:
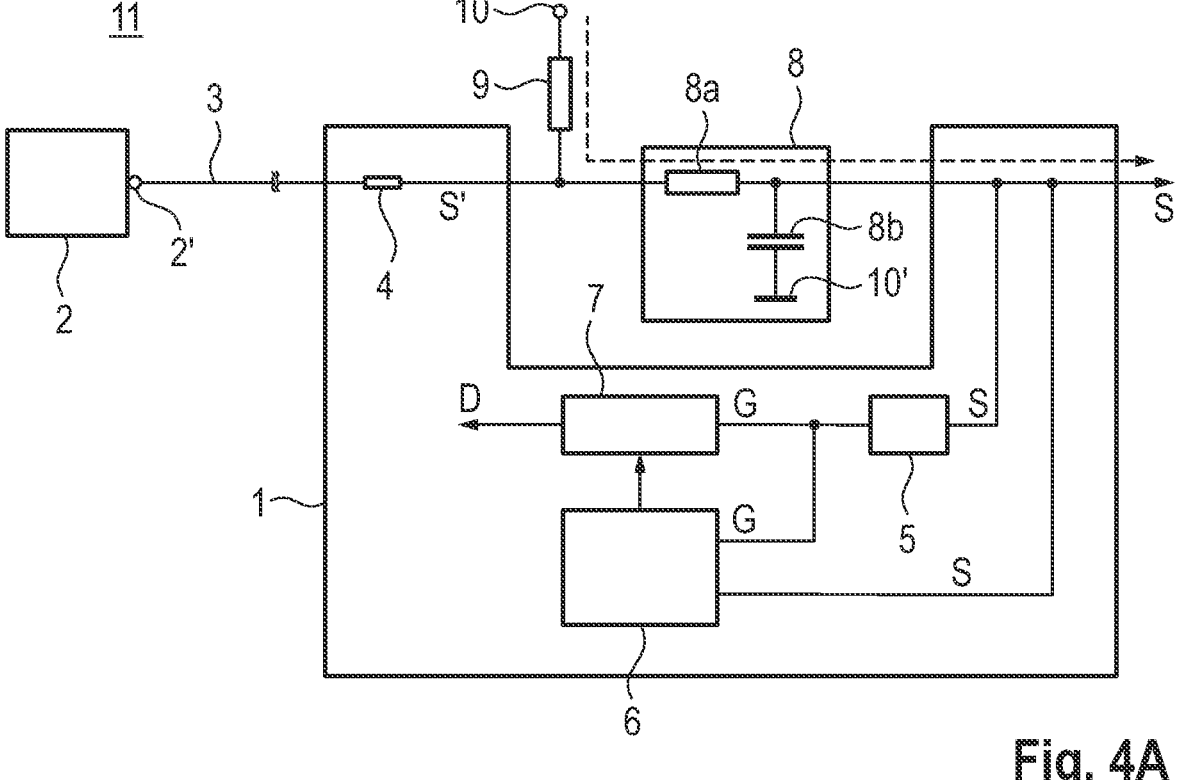
FIG. 4A shows a schematic representation of the disclosed diagnostic device and the sensor device of FIG. 1 in response to a third error type being present.

The sensor device 11 is schematically shown in FIG. 4A when an intermittent open circuit of the signal output 2' is present, as indicated by two parallel dashed lines between the signal output 2' and the sensor terminal 4. Two corresponding signal diagrams are shown in FIG. 4B.

Figure 4B:
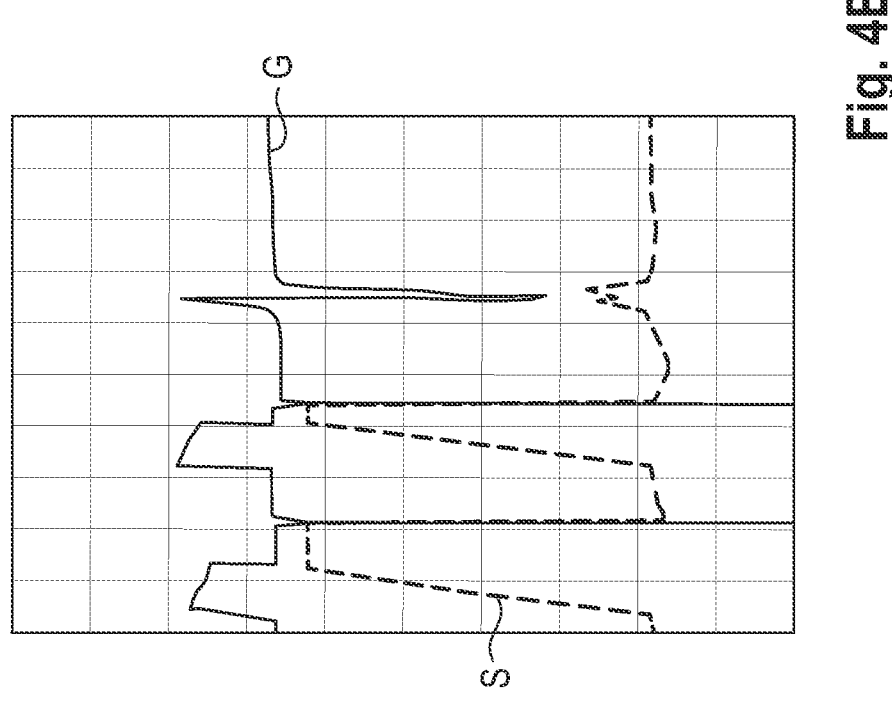
FIG. 4B shows schematic signal diagrams relating to the third error type of FIG. 4A.
Figure 4B:
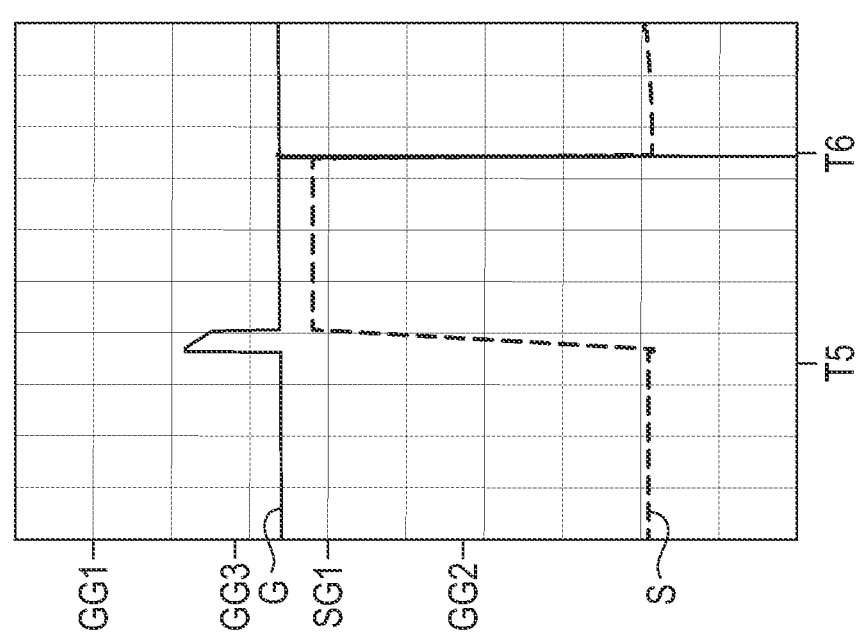

A situation is shown in the left diagram of FIG. 4B, which is similar at first glance to that of FIG. 2B. In comparison thereto, however, the signal rise of the sensor signal S at the point in time T5 is less steeply pronounced than the sudden rise of the sensor signal S at the point in time T1 in FIG. 2B. This can be attributed, as can be seen in FIG. 4A, to the capacitor 8b of the low-pass filter 8 taking place with a delay due to the coupling to the first reference potential terminal 10 via the resistor 8a and the pull up resistor 9. In particular, the gradient signal G does not reach the first gradient limiting value GG1 during the first flank. However, the gradient signal G exceeds a third gradient limiting value GG3 during the first flank. The sudden fall of the sensor signal S at the point in time T6 corresponds to the sudden fall at the point in time T2 in FIG. 2B. This curve can be distinguished by analysis of the gradient signal G by the evaluation unit 6 from the state of affairs of FIG. 2A and FIG. 2B, since the value of the gradient signal G during the first flank is less than in the case of the short circuit of FIG. 2A. Accordingly, the evaluation unit 6 can identify the open circuit of the signal output 2' as the error type. In the right diagram of FIG. 4B, three successive cycles of an open circuit are schematically shown, in each of which the open circuit is established and ended again.

As described with respect to the figures, the presence of intermittent errors of analog sensors can, thus, be reliably determined and different errors can be reliably distinguished from one another on the basis of the improved concept. In particular, so-called jittery signals can, thus, be effectively monitored, which are acquired as repeated rising and falling of the sensor signal. In particular, regulatory requirements for monitoring such signals in transportation vehicles can, thus, be met.

Since at least two flanks of the sensor system are analyzed according to the improved concept, misdiagnoses due, for example, to load shocks and the like can be avoided.

In particular, open circuits or "open circuit" situations can be identified by the improved concept. These can be induced by lifting off and replacing the contact of the sensor signal line. Upon the contact interruption, the sensor signal rises continuously to a maximum voltage value. If the signal line is contacted again, the value of the sensor signal, thus, jumps abruptly back to the value corresponding to the physical measured variable.

Moreover, according to the improved concept, short circuits of the signal output of the sensor to a reference potential terminal, for example, to a battery terminal or ground terminal, can be identified. These can be identified according to the improved concept by a sudden rise followed by a sudden fall of the sensor signal or vice versa.

The improved concept can also be applied for other analog electronic components having analog output signal, which do not represent sensors. The analog electronic component can be designed, for example, as a control unit. The sensor signal is then to be replaced in the various exemplary embodiments by the analog output signal of the analog electronic component.

LIST OF REFERENCE SIGNS 1 diagnostic device
2 sensor
2' signal output
3 lines
4 sensor terminal
5 differentiator
6 evaluation unit
7 integrator
8 low-pass filter
8a resistor
8b capacitor
9 pull-up resistor
10, 10' reference potential terminals
11 sensor device
S sensor signal
S' output signal
G gradient signal
D diagnostic signal
T1, T2, T3, T4, T5, T6 points in time
GG1, GG2, GG3 gradient limiting values
SG1, SG2 signal limiting values

The invention claimed is:

1. A method for sensor error analysis for unstable errors, wherein a sensor outputs an analog sensor signal as a function of a measured variable, the method comprising:
   generating a gradient signal as a function of the sensor signal;
   assigning, by an evaluation unit, a flank category of a plurality of specified flank categories to a first flank of the sensor signal based on the gradient signal;
   assigning, by the evaluation unit, a flank category of the plurality of flank categories to a second flank of the sensor signal based on the gradient signal, wherein the second flank follows the first flank; and
   determining, by the evaluation unit, an error class as a function of the flank category assigned to the first flank and the flank category assigned to the second flank, wherein:
      the first flank is assigned to a first flank category of the plurality of flank categories only in response to the gradient signal exceeding a positive first gradient limiting value during the first flank; and
      the second flank is assigned to the first flank category only in response to the gradient signal exceeding the first gradient limiting value during the second flank.

2. The method of claim 1, wherein:
   the first flank is assigned to a second flank category of the plurality of flank categories only in response to the gradient signal falling below a negative second gradient limiting value during the first flank; and
   the second flank is assigned to the second flank category only in response to the gradient signal falling below the second gradient limiting value during the second flank.

3. The method of claim 2, wherein:
   the first flank is assigned to the first flank category only in response to the sensor signal exceeding a first signal limiting value during the first flank and/or the second flank is assigned to the first flank category only in response to the sensor signal exceeding the first signal limiting value during the second flank; and/or
   the first flank is assigned to the second flank category only in response to the sensor signal falling below a second signal limiting value during the first flank and/or the second flank is assigned to the second flank category only in response to the sensor signal falling below the second signal limiting value during the second flank.

4. The method of claim 2, wherein the error class is determined to be an intermittent short circuit of a sensor signal output to a first reference potential terminal in response to the first flank being assigned to the first flank category and the second flank being assigned to the second flank category.

5. The method of claim 4, wherein the error class is determined to be an intermittent short circuit of the sensor signal output to a second reference potential terminal in response to the first flank being assigned to the second flank category and the second flank being assigned to the first flank category, wherein the first reference potential terminal and the second reference potential terminal are at different electrical reference potentials.

6. The method of claim 2, wherein:
   the plurality of flank categories include at least three flank categories; and
   the first flank is assigned to a third flank category of the at least three flank categories only in response to the gradient signal exceeding a positive third gradient limiting value and not exceeding the first gradient limiting value during the first flank.

7. The method of claim 6, wherein the error class is determined to be an intermittent open circuit of the signal output only in response to the first flank being assigned to the third flank category and the second flank being assigned to the second flank category.

8. The method of claim 2, wherein:
   the plurality of flank categories include at least three flank categories; and
   the first flank is assigned to a third flank category of the at least three flank categories only in response to the gradient signal falling below a negative fourth gradient limiting value and not falling below the second gradient limiting value during the first flank.

9. The method of claim 8, wherein the error class is determined to be an open circuit of the signal output in response to the first flank being assigned to the third flank category and the second flank being assigned to the first flank category.

10. The method of claim 1, wherein at least one diagnostic signal is generated as a function of a height of the first flank and/or a height of the second flank.

11. The method of claim 10, wherein the at least one diagnostic signal is generated as a function of the determined error class.

12. A diagnostic device for sensor error analysis with respect to unstable errors, wherein the sensor outputs an analog sensor signal as a function of a measured variable, wherein the diagnostic device comprising:
   a differentiator configured to generate a gradient signal as a function of the sensor signal; and
   an evaluation unit configured to:
      assign a flank category of a plurality of specified flank categories to a first flank of the sensor signal based on the gradient signal;

assign a flank category of the plurality of flank categories to a second flank, following the first flank, of the sensor signal based on the gradient signal; and determine an error class as a function of the flank category assigned to the first flank and the flank category assigned to the second flank, wherein:

the first flank is assigned to a first flank category of the plurality of flank categories only in response to the gradient signal exceeding a positive first gradient limiting value during the first flank; and the second flank is assigned to the first flank category only in response to the gradient signal exceeding the first gradient limiting value during the second flank.

13. The diagnostic device of claim 12, further comprising an integrator configured to generate a diagnostic signal by integration of the gradient signal during the first flank and/or during the second flank.

14. A transportation vehicle having the diagnostic device of claim 13.

15. The diagnostic device of claim 12, wherein the integrator generates the diagnostic signal as a function of the determined error type.

16. The diagnostic device of claim 12, wherein:

the first flank is assigned to a second flank category of the plurality of flank categories only in response to the gradient signal falling below a negative second gradient limiting value during the first flank; and the second flank is assigned to the second flank category only in response to the gradient signal falling below the second gradient limiting value during the second flank.

17. The diagnostic device of claim 16, wherein:

the first flank is assigned to the first flank category only in response to the sensor signal exceeding a first signal limiting value during the first flank and/or the second flank is assigned to the first flank category only in response to the sensor signal exceeding the first signal limiting value during the second flank; and/or the first flank is assigned to the second flank category only in response to the sensor signal falling below a second signal limiting value during the first flank and/or the second flank is assigned to the second flank category only in response to the sensor signal falling below the second signal limiting value during the second flank.

18. The diagnostic device of claim 16, wherein the error class is determined to be an intermittent short circuit of a sensor signal output to a first reference potential terminal in response to the first flank being assigned to the first flank category and the second flank being assigned to the second flank category.

19. The diagnostic device of claim 18, wherein the error class is determined to be an intermittent short circuit of the sensor signal output to a second reference potential terminal in response to the first flank being assigned to the second flank category and the second flank being assigned to the first flank category, wherein the first reference potential terminal and the second reference potential terminal are at different electrical reference potentials.

20. The diagnostic device of claim 16, wherein:

the plurality of flank categories include at least three flank categories; and the first flank is assigned to a third flank category of the at least three flank categories only in response to the gradient signal exceeding a positive third gradient limiting value and not exceeding the first gradient limiting value during the first flank.

21. The diagnostic device of claim 20, wherein the error class is determined to be an intermittent open circuit of the signal output only in response to the first flank being assigned to the third flank category and the second flank being assigned to the second flank category.

22. The diagnostic device of claim 16, wherein:

the plurality of flank categories include at least three flank categories; and the first flank is assigned to a third flank category of the at least three flank categories only in response to the gradient signal falling below a negative fourth gradient limiting value and not falling below the second gradient limiting value during the first flank.

23. The diagnostic device of claim 22, wherein the error class is determined to be an open circuit of the signal output in response to the first flank being assigned to the third flank category and the second flank being assigned to the first flank category.

24. The diagnostic device of claim 12, wherein at least one diagnostic signal is generated as a function of a height of the first flank and/or a height of the second flank.

25. The diagnostic device of claim 24, wherein the at least one diagnostic signal is generated as a function of the determined error class.

26. The method of claim 1, wherein an integrator generates a diagnostic signal by integration of the gradient signal during the first flank and/or during the second flank.

27. The method of claim 26, wherein the integrator generates the diagnostic signal as a function of the determined error type.

* * * * *